US012619387B2

(12) United States Patent
Ahn et al.

(10) Patent No.: US 12,619,387 B2
(45) Date of Patent: May 5, 2026

(54) DISPLAY DEVICE

(71) Applicant: LG ELECTRONICS INC., Seoul (KR)

(72) Inventors: Sangjin Ahn, Seoul (KR); Eunyoung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/866,811

(22) PCT Filed: May 17, 2022

(86) PCT No.: PCT/KR2022/007076
§ 371 (c)(1),
(2) Date: Nov. 18, 2024

(87) PCT Pub. No.: WO2023/224143
PCT Pub. Date: Nov. 23, 2023

(65) Prior Publication Data
US 2025/0355607 A1      Nov. 20, 2025

(51) Int. Cl.
*G09G 5/00* (2006.01)
*G06F 3/14* (2006.01)
(52) U.S. Cl.
CPC ..................................... *G06F 3/14* (2013.01)
(58) Field of Classification Search
CPC ........ G06F 3/14; G09G 3/2096; G09G 5/006;
G09G 2370/02; G09G 2370/06;
(Continued)

(56) References Cited

U.S. PATENT DOCUMENTS 10,129,113 B2    11/2018    Zheng et al.
10,701,201 B2     6/2020    Jeong et al.
(Continued)

FOREIGN PATENT DOCUMENTS

EP            2501143         9/2012
JP         2020518208         6/2020
(Continued)

OTHER PUBLICATIONS

PCT International Application No. PCT/KR2022/007076, International Search Report dated Feb. 15, 2023, 2 pages.
(Continued)

*Primary Examiner* — Jennifer T Nguyen
(74) *Attorney, Agent, or Firm* — LEE, HONG, DEGERMAN, KANG & WAIMEY

(57) ABSTRACT

A display device according to an embodiment of the present disclosure may comprise: a display; an external device interface connected to an external device; and a controller that recognizes a device corresponding to information received from the external device and configures the recognized device as a connection device through the external device interface, wherein, when multiple pieces of information are received from the external device, the controller recognizes a device corresponding to each of the multiple pieces of information, calculates recognition accuracy of the device corresponding to each of the multiple pieces of information, and configures, on the basis of the calculated recognition accuracy, a device recognized corresponding to one of the multiple pieces of information, as a connection device.

15 Claims, 10 Drawing Sheets

(58) Field of Classification Search
     CPC ......... G09G 2320/103; G09G 2340/12; G09G
                         2370/16; G09G 2370/22; H04N
                        21/44227; H04N 21/43635; H04N
                                       21/4104
     USPC ........................................................ 345/156
     See application file for complete search history.

(56) References Cited

U.S. PATENT DOCUMENTS

| | | | | |
|---|---|---|---|---|
| 2020/0359083 | A1* | 11/2020 | Chung ................... | G06F 3/0482 |
| 2021/0058394 | A1* | 2/2021 | Zhang ................... | H04L 63/102 |
| 2021/0136450 | A1* | 5/2021 | Kim ................. | H04N 21/42684 |
| 2022/0020314 | A1* | 1/2022 | Lee ................. | H04N 21/43615 |

FOREIGN PATENT DOCUMENTS

| | | |
|---|---|---|
| KR | 1020110037061 | 4/2011 |
| KR | 1020170036651 | 4/2017 |

OTHER PUBLICATIONS

European Patent Office Application Serial No. 22942807.3, Search Report dated May 12, 2025, 8 pages.

\* cited by examiner

Figure 6:
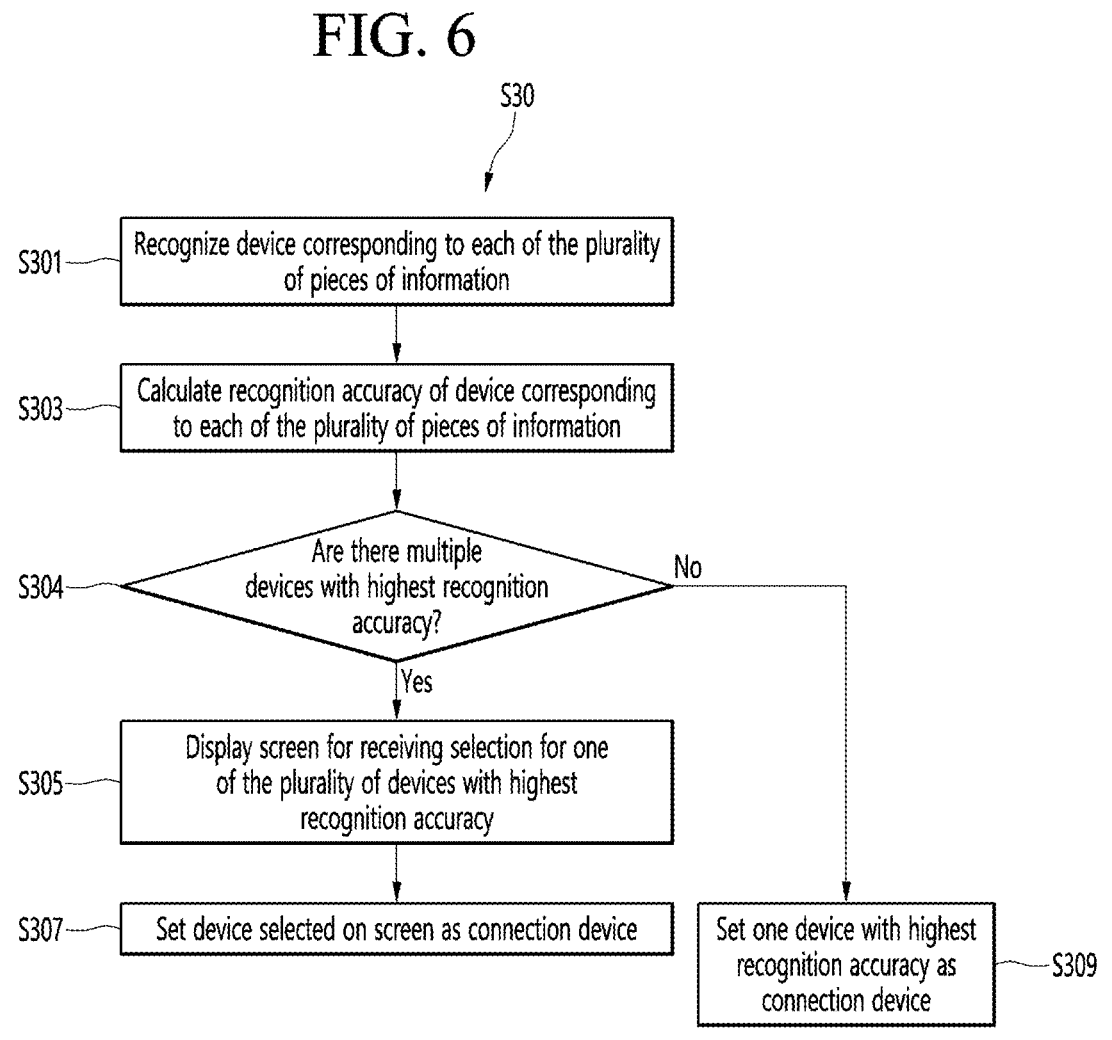

| S301 | Recognize device corresponding to each of the plurality of pieces of information |

| S303 | Calculate recognition accuracy of device corresponding to each of the plurality of pieces of information |

| S304 | Are there multiple devices with highest recognition accuracy? | No |

Yes

| S305 | Display screen for receiving selection for one of the plurality of devices with highest recognition accuracy |

| S307 | Set device selected on screen as connection device |

| Set one device with highest recognition accuracy as connection device | S309 |

FIG. 8

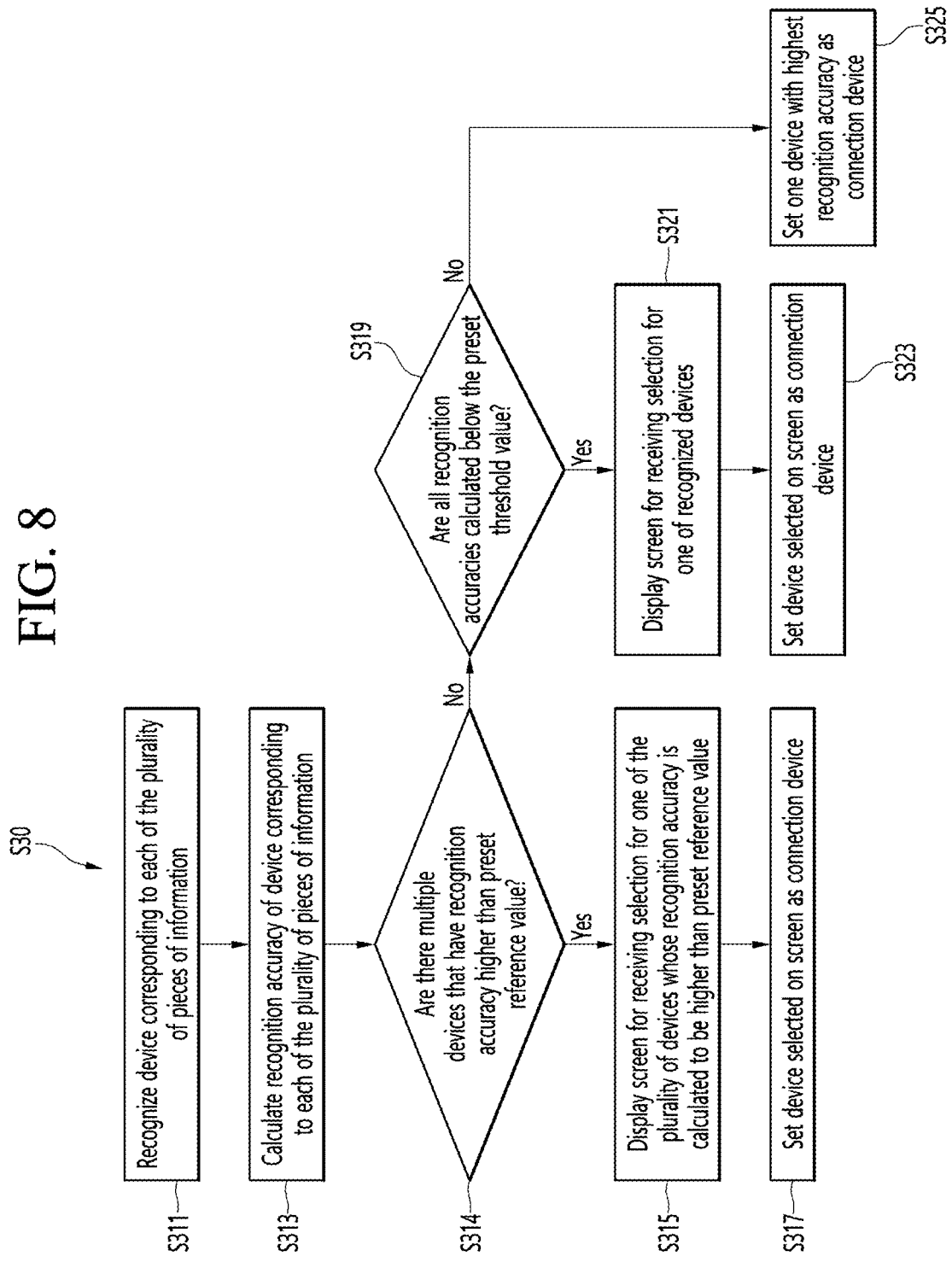

S30

S311  Recognize device corresponding to each of the plurality of pieces of information S313  Calculate recognition accuracy of device corresponding to each of the plurality of pieces of information S314  Are there multiple devices that have recognition accuracy higher than preset reference value?

No → S319  Are all recognition accuracies calculated below the preset threshold value?

No → S325  Set one device with highest recognition accuracy as connection device S319 Yes → S321  Display screen for receiving selection for one of recognized devices S323  Set device selected on screen as connection device S314 Yes → S315  Display screen for receiving selection for one of the plurality of devices whose recognition accuracy is calculated to be higher than preset reference value S317  Set device selected on screen as connection device

DISPLAY DEVICE

CROSS-REFERENCE TO RELATED APPLICATION(S)

This application is the National Stage filing under 35 U.S.C. 371 of International Application No. PCT/KR2022/007076, filed on May 17, 2022, the contents of which are all incorporated by reference herein in its entirety.

TECHNICAL FIELD

The present disclosure relates to a display device. More specifically, the present disclosure relates to a display device that automatically recognizes and sets a connected external device.

BACKGROUND ART

Digital TV services using wired or wireless communication networks are becoming common. The digital TV services may provide various services that cannot be provided by existing analog broadcasting services.

For example, in the case of IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, etc., based on such interactivity.

And recently, the number of users who watch more diverse videos through external devices such as set-top boxes and DVD players, not limited to the videos provided by the display device itself, is increasing. Accordingly, display devices provide various functions for the convenience of users when connected to an external devices, and for example, provide an integrated remote control function. The integrated remote control function is a function that allows multiple devices to be controlled with only one remote control.

Meanwhile, in order to provide various functions such as the integrated remote control function, settings suitable for the external device connected to the display device are required, so information about the device is required so that the external device can be identified. Accordingly, the display device can manually input information about the external device or automatically recognize the external device.

In the past, when the external device was connected, the display device recognized the external device based on the information received from the external device. However, since each external device arbitrarily transmits information to the display device, information can be transmitted through various paths and at various times, and the types or orders of the transmitted information are all different, problems of incorrectly recognizing the external device occur during this process. In addition, even if an external device is recognized incorrectly in this way, there is no function to verify or correct it, which causes inconvenience to the user.

DISCLOSURE

Technical Problem

The purpose of this present disclosure is to provide a display device that minimizes problems caused by misrecognition of an external device.

The purpose of this present disclosure is to provide a display device that performs re-recognition when an external device is misrecognized.

Technical Solution

The display device according to an embodiment of present disclosure comprises a display, an external device interface configured to connect to an external device, and a controller configured to recognize a device corresponding to information received from the external device and set the recognized device as a connection device through the external device interface, wherein the controller is configured to recognize a device corresponding to each of the plurality of pieces of information when receiving a plurality of pieces of information from the external device, calculate a recognition accuracy of a device corresponding to each of the plurality of pieces of information, and set a recognized device corresponding to one of the plurality of pieces of information as the connection device based on the calculated recognition accuracy.

The controller is configured to set a device with a highest recognition accuracy among the recognized devices as the connection device when there are a plurality of recognized devices corresponding to each of the plurality of pieces of information.

The controller is configured to, when receiving first information and second information from the external device and recognizing a first device and a second device corresponding to the first information and the second information, respectively, set a device corresponding to a higher recognition accuracy among a recognition accuracy of the first device and a recognition accuracy of the second device as the connection device.

The controller is configured to display a screen for receiving a selection for one of the first device and the second device on the display when the recognition accuracy of the first device and the recognition accuracy of the second device are the same.

The controller is configured to, when there are a plurality of devices recognized corresponding to each of the plurality of pieces of information, set a device whose recognition accuracy is calculated to be higher than a preset reference value as the connection device.

The controller is configured to, when there are a plurality of devices whose recognition accuracy is calculated to be higher than a preset reference value, display a screen for receiving a selection for one of the plurality of devices whose recognition accuracy is calculated to be higher than the preset reference value on the display.

The controller is configured to, if the recognition accuracy of each device for each of the plurality of pieces of information is calculated to be less than a preset threshold value, display a screen for receiving a selection for one of the recognized devices corresponding to each of the plurality of pieces of information on the display.

The controller is configured to set priorities for each of the plurality of pieces of information, and if there are a plurality of devices with the same recognition accuracy, set a device recognized corresponding to information with a highest priority as the connection device.

The controller is configured to set the priorities differently depending on a device type.

The controller is configured to calculate the recognition accuracy by assigning weight to at least one of the plurality of pieces of information.

The controller is configured to assign different weights to each of the plurality of pieces of information depending on information type.

The controller is configured to, when receiving second information after setting a first device recognized corresponding to first information received from the external device as the connection device, and if a recognition accuracy of the second device recognized based on the second information is higher than a recognition accuracy of the first device, change the connection device to the second device.

The controller is configured to, when receiving second information after setting a first device recognized corresponding to first information received from the external device as the connection device, and if a recognition accuracy of the second device recognized based on the second information is lower than a recognition accuracy of the first device, maintain the connection device as the first device.

The controller is configured to change or maintain the set connection device by recognizing a device corresponding to a received information whenever information is received from the external device.

The plurality of pieces of information includes at least one of SPD Infoframe, CEC packet, IP metadata and Zigbee packet.

Advantageous Effects

According to an embodiment of the present disclosure, there is an advantage in that the setting accuracy of the connection device is improved by calculating recognition accuracy and setting the connection device based on the recognition accuracy.

According to an embodiment of the present disclosure, there is an advantage in that the connection device is set through user selection when there are multiple devices with the highest recognition accuracy or devices with a reference value or higher, thereby minimizing problems due to misrecognition.

According to an embodiment of the present disclosure, even if various pieces of information are transmitted from various external devices, it is possible to recognize them and set them as the connection device, so there is an advantage in that various functions such as an integrated remote control can be normally provided.

DESCRIPTION OF DRAWINGS

FIG. 6 is a flowchart illustrating a method for a display device according to a first embodiment of the present disclosure to set a connection device based on a plurality of pieces of information.

FIG. 8 is a flowchart illustrating a method for a display device according to a second embodiment of the present disclosure to set a connection device based on a plurality of pieces of information.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
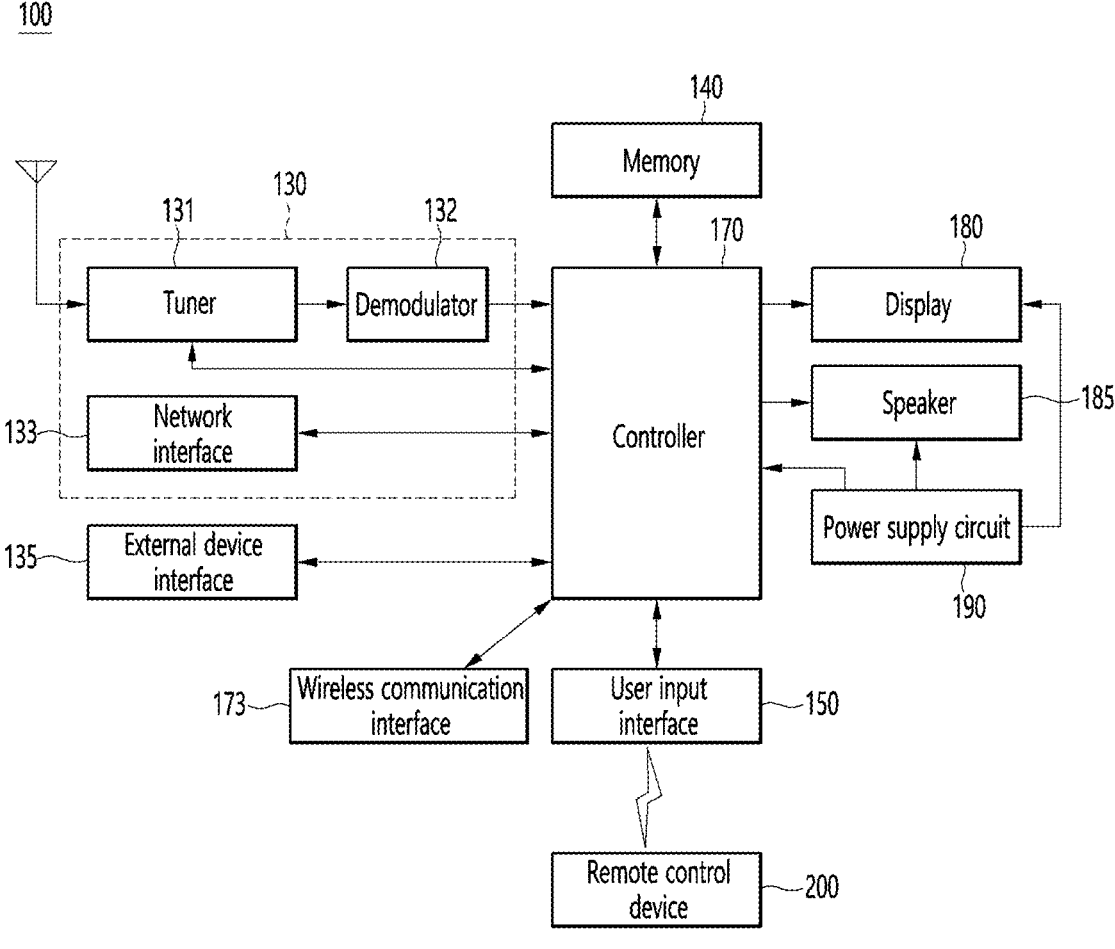
FIG. 1 is a block diagram illustrating a configuration of a display device according to an embodiment of the present invention.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a contents provider or a network operator. That is, the network interface 133 may receive content such as movies, advertisements, games, VOD, and broadcast signals and information related thereto provided from a contents provider or a network provider through a network.

In addition, the network interface 133 may receive update information and update files of firmware provided by the network operator, and may transmit data to an Internet or contents provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
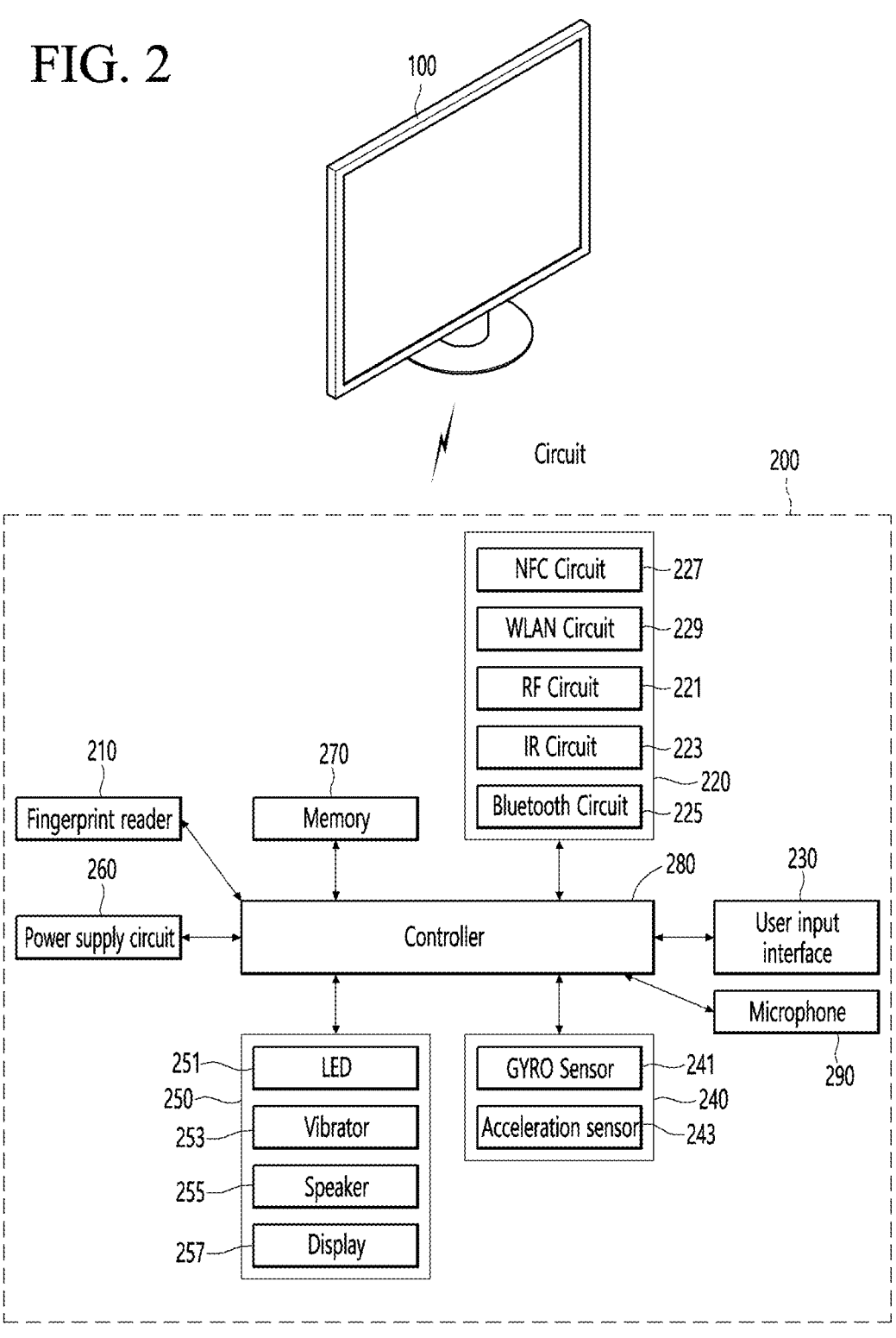
FIG. 2 is a block diagram of a remote control device according to an embodiment of the present invention.
Figure 3:
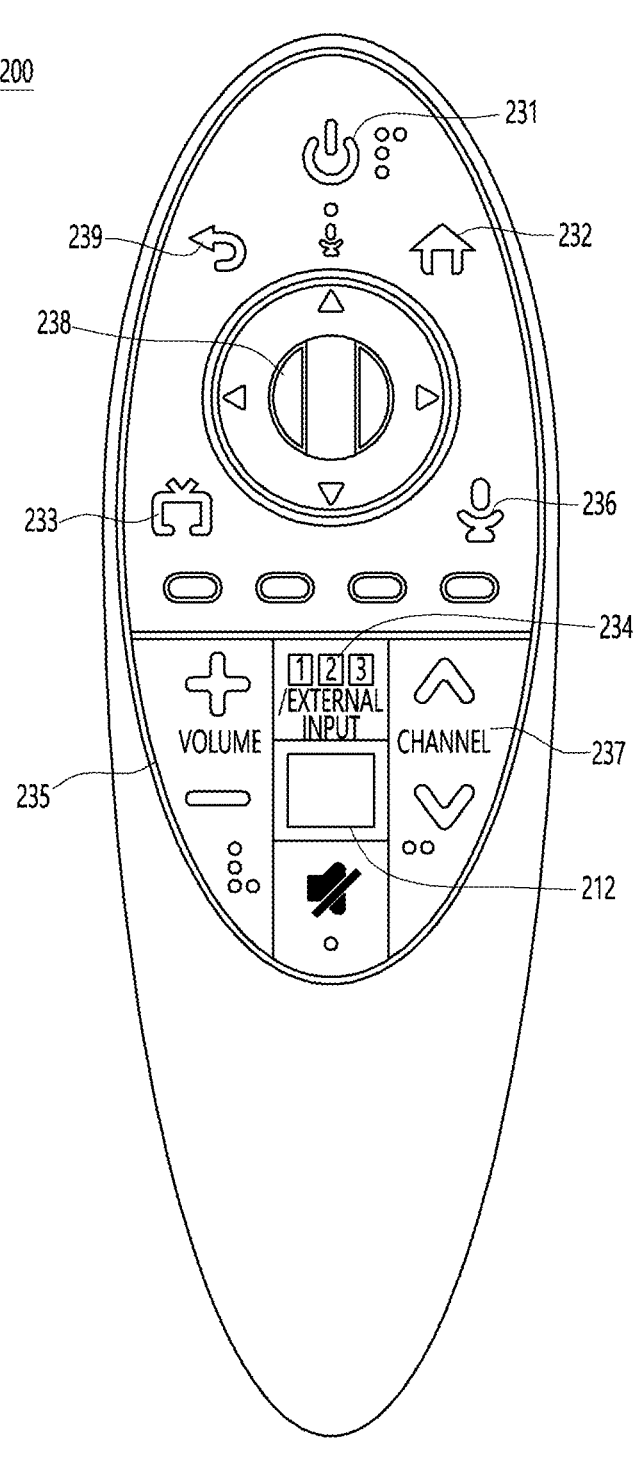
FIG. 3 shows an example of an actual configuration of a remote control device according to an embodiment of the present invention.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

Figure 4:
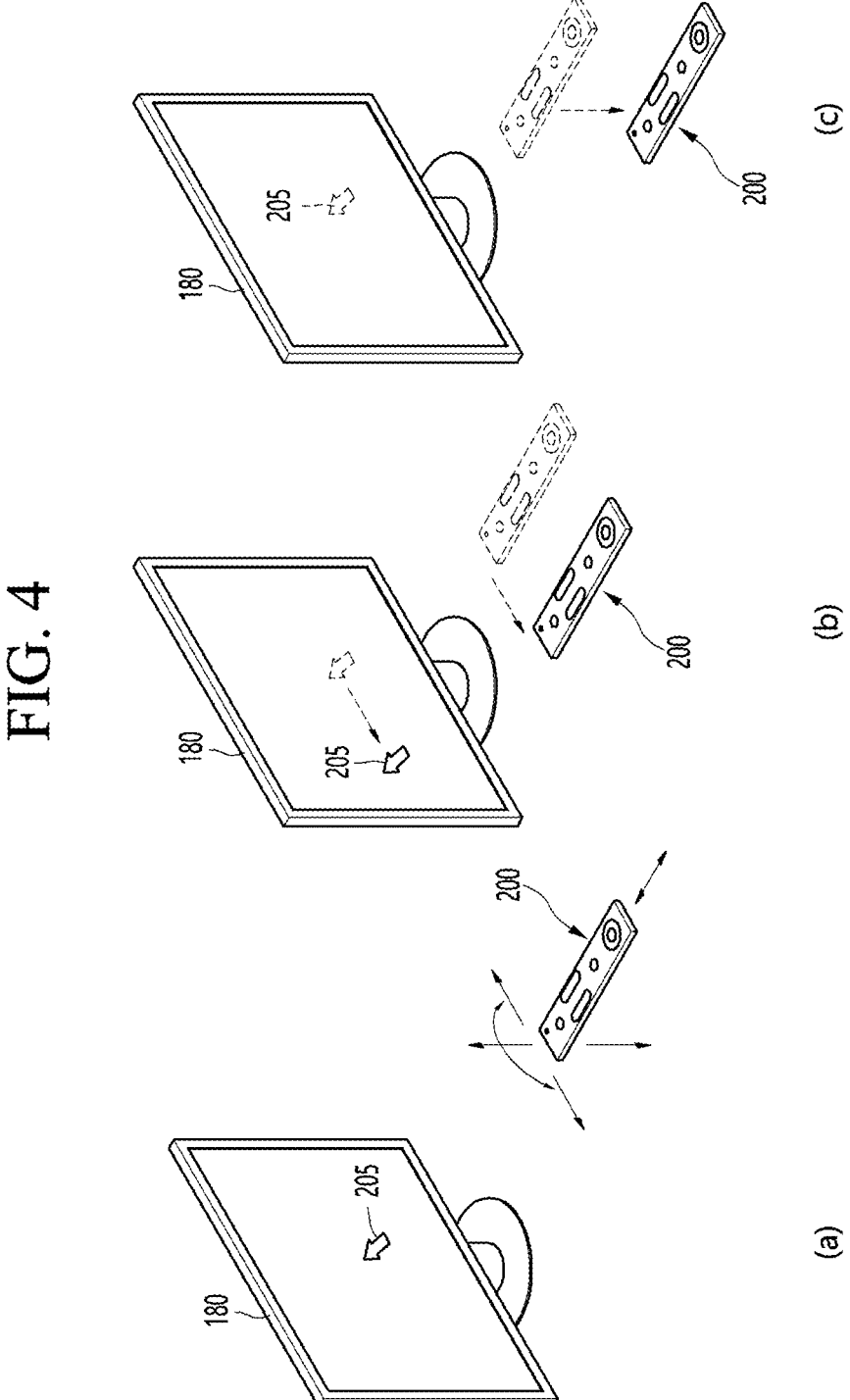
FIG. 4 shows an example of utilizing a remote control device according to an embodiment of the present invention.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Meanwhile, the display device 100 can recognize what kind of external device is based on the information transmitted from the external device when the external device is connected, and set the recognized device as the external device connected to the display device 100. However, each external device transmits various information to the display device 100, and the path and time at which each information is transmitted also vary. Accordingly, the conventional display device 100 recognizes the external device based on the information that is received first from the external device, but since the type of information that is received first varies for each external device, there is often a problem of mis-recognition in the process of recognizing the external device based on such various information. In addition, the conventional display device 100 does not verify or correct whether the recognition of the external device was performed properly, and ends the recognition procedure with one external device recognition, which causes inconvenience to the user.

Figure 5:
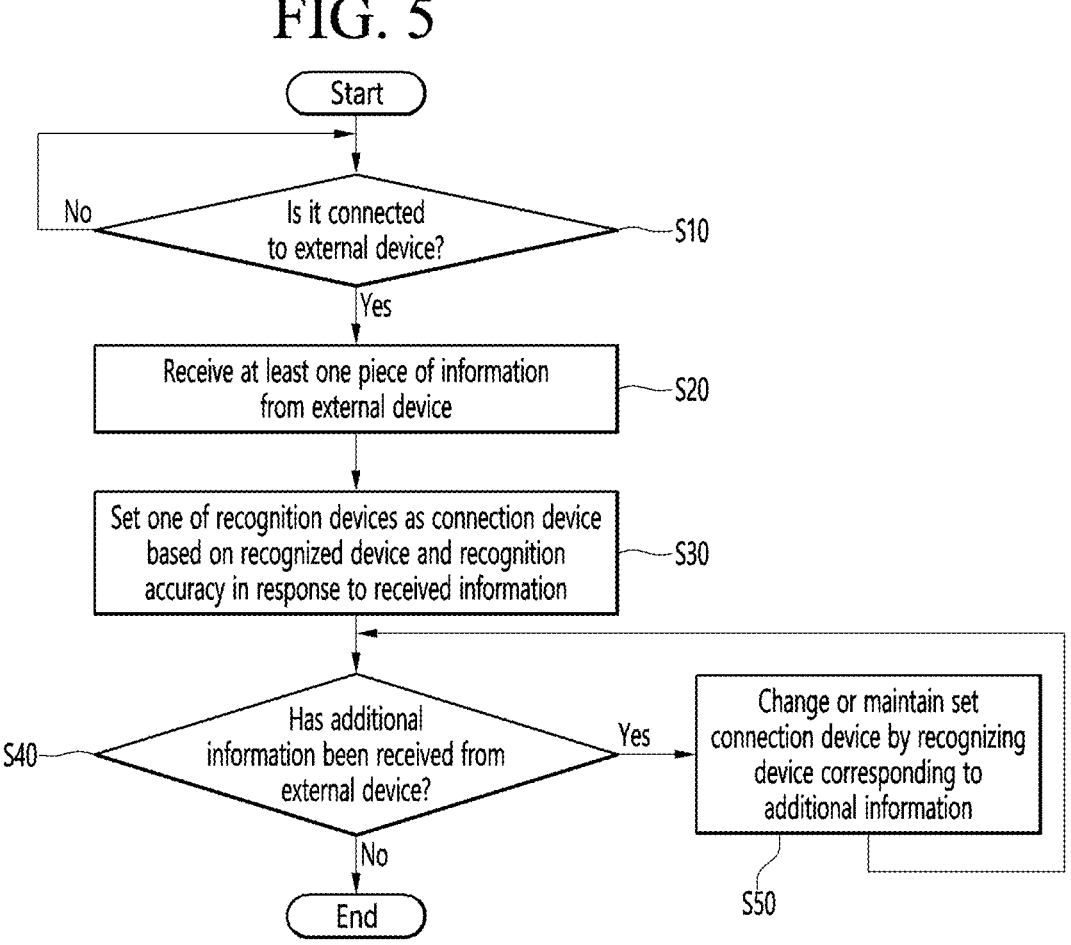
FIG. 5 is a flowchart illustrating a method of operating a display device according to an embodiment of the present disclosure.

FIG. 5 is a flowchart illustrating a method of operating a display device according to an embodiment of the present disclosure.

The controller 170 can obtain whether the display device is connected to the external device (S10).

That is, the controller 170 can detect whether or not the external device is connected. If the connection of the external device is not detected, the controller 170 can continue to obtain whether or not the external device is connected.

If the connection of the external device is detected, the controller 170 can receive at least one piece of information from the external device (S20).

The information may be information that the external device provides to the display device 100 when the external device is connected to the display device 100. The information may be device information of the external device. For example, the information may include at least one of an SPD Infoframe, a CEC packet, IP metadata, and a Zigbee packet.

SPD Infoframe is a Source Product Description Infoframe and may include information about the manufacturer (spd-VendorName), model name (spdProductDescription), and device type (spdSourceDeviceInfo).

CEC packet is a Consumer Electronics Control packet and may include information about the model name (osdName), device type (uniqueld), and manufacturer (vendorld).

IP metadata may be information transmitted through the IP network when display device 100 is connected to the same IP as the external device.

Zigbee packet may be information transmitted through Zigbee communication when display device 100 is connected to the external device via Zigbee.

Meanwhile, SPD Infoframe, CEC packet, IP metadata, and Zigbee packet are only examples for explanation, and the types of information that display device 100 receives from the external device may be more diverse.

The controller 170 can set one of the recognition devices as the connection device based on the recognized device and recognition accuracy in response to the received information (S30).

Specifically, the controller 170 recognizes a device in response to the received information, calculates the recognition accuracy of the device, and sets one of the recognition devices as a connection device connected to the display device 100 based on the calculated recognition accuracy.

When receiving one piece of information from an external device, the controller 170 can set a recognized device based on the received one piece of information as a connection device.

If the controller 170 receives a plurality of pieces of information from an external device, the controller 170 recognizes a device corresponding to each of the received plurality of pieces of information, calculates the recognition accuracy of the device corresponding to each of the plurality of pieces of information, and sets one of the recognized devices as a connection device through the external device interface 135 based on the calculated recognition accuracy. Meanwhile, the case of receiving a plurality of pieces of information from an external device may include not only the case where a plurality of pieces of information is received simultaneously immediately after the external device is connected to the display device 100, but also the case where a plurality of pieces of information is received during a preset period of time after the external device is connected to the display device 100.

The method in which the controller 170 sets one of the recognition devices as the connection device based on the recognized device in response to the received information and recognition accuracy may vary, and this will be described in detail with reference to FIGS. 6 to 11.

FIG. 6 is a flowchart illustrating a method in which a display device according to the first embodiment of the present disclosure sets a connection device based on a plurality of pieces of information.

FIG. 6 is a flowchart illustrating a method of performing S30 of FIG. 5 according to the first embodiment.

According to the first embodiment, the controller 170 can recognize a device corresponding to each of the plurality of pieces of information (S301).

The plurality of pieces of information may mean a plurality of pieces of information received from the external device when the external device is connected to the display device 100.

For example, when the controller 170 receives the first information and the second information from the external device, it can recognize the device corresponding to the first information and the device corresponding to the second information. That is, when the controller 170 receives the first information and the second information from the external device, it can recognize the device corresponding to each of the first and second information.

In addition, the controller 170 can obtain various information such as the service provider, manufacturer, device type, model name, code set, and ID when recognizing the device.

In addition, the controller 170 can calculate the recognition accuracy of the device corresponding to each of the plurality of pieces of information (S303).

The controller 170 can calculate the recognition accuracy in various ways. For example, the controller 170 can calculate the recognition accuracy based on the type and number of data that serve as criteria for recognizing a specific device in each piece of information.

The display device 100 may store a database (DB) for calculating the recognition accuracy for each piece of information in the memory 140.

The controller 170 can calculate the recognition accuracy in various formats such as probability (percentage), score, etc.

For example, the controller 170 can calculate the recognition accuracy of recognizing a first device based on first information as a first probability, and the recognition accuracy of recognizing a second device based on second information as a second probability.

Next, an embodiment of calculating recognition accuracy according to each piece of information based on data stored in a database by controller 170 is described.

According to an embodiment, the database may include data as shown in Table 1 below. Data as shown in Table 1 below may be generated based on information received from actual external devices when various external devices are connected to display device 100. Referring to Table 1, various pieces of information related to devices may be stored in the database in the form of a set by mapping information (named as identification information in Table 1) received by actual display device 100 when each device is connected to display device 100, and each set may be distinguished by Flag 1, 2, . . . of Table 1.

TABLE 1

| Flag | Service provider | Model name | Device type | IR Codeset | Identification information |
|------|------------------|------------|-------------|------------|---------------------------|
| 1 | Company x | ABC12 | STB | C1234 | Company x, ABC12, STB |
| 2 | Company y | DEF34 | STB | RR213 | Company y, DEF34, STB |
| . . . | . . . | . . . | . . . | . . . | |

Therefore, when controller 170 receives information from a connected external device, it can compare the received information with the identification information in the database to calculate the recognition accuracy.

Meanwhile, weights may be set for each sub-item of information received from an external device. For example, in the case of SPD Infoframe, weights of 0.2, 0.5, and 0.3 may be set for each of the sub-items of manufacturer (spdVendorName), model name (spdProductDescription), and device type (spdSourceDeviceInfo). And, in the case of CEC packets, weights of 0.5, 0.3, and 0.2 may be set for each of the sub-items of osdName (model name), uniqueId (device type), and vendorId (manufacturer). Accordingly, the controller 170 may compare each sub-item of information received from an external device to the identification information stored in the database to determine whether it matches, and if it matches, multiply the weight of the corresponding item by 1, and if it does not match, multiply the weight of the corresponding item by 0 to calculate the recognition accuracy.

For example, when controller 170 receives information of "x company, ABC12, STB" from the first device according to the connection of the first device, the recognition accuracy for the device corresponding to Flag 1 can be calculated as 100% by $(1)*0.2+(1)*0.5+(1)*0.3=1$, and the recognition accuracy for the device corresponding to Flag 2 can be calculated as 30% by $(0)*0.2+(0)*0.5+(1)*0.3=0.3$.

As described above, controller 170 can calculate the device recognition accuracy according to each piece of information based on the data stored in the database. In particular, since the recognition accuracy is calculated by setting weights for the sub-items of each piece of information, it is possible to calculate the recognition accuracy considering the manufacturer, each manufacturer, the type of device, etc., and thus, there is an advantage of improving the reliability of the recognition accuracy calculation.

As another example, controller 170 sets weights for each of SPD Infoframe and CEC packet, and when SPD Infoframe and CEC packet are received together, recognition accuracy can be calculated by considering the weights assigned to each piece of information. For example, the database can include data having both SPD Infoframe and CEC packet as identification information, as shown in Table 2 below.

TABLE 2

| Flag | Service provider | Model name | Device type | IR Codeset | Identification information |
|------|------------------|------------|-------------|------------|---------------------------|
| 1 | Company x | ABC12 | STB | C1234 | Company x, ABC12, STB ABC12, STB, Company x |
| 2 | Company y | DEF34 | STB | RR213 | Company y, DEF34, STB DFF34, STB, Company y |
| . . . | . . . | . . . | . . . | . . . | |

As a specific example, the SPD Infoframe and CEC packet may have weights set to 0.4 and 0.6, respectively. When controller 170 receives the SPD Infoframe of "Company x, DEF34, STB" and the CEC packet of "DEF34, STB, Company y" from the second device according to the connection of the second device, the recognition accuracy of the device corresponding to Flag 1 is calculated as 38% by $\{(1)*0.2+(0)*0.5+(1)*0.3\}*0.4+\{(0)*0.5+(1)*0.3+(0)*0.2\}*0.6=0.38$, and the recognition accuracy of the device corresponding to Flag 2 is calculated as 92% by $\{(0)*0.2+(1)*0.5+(1)*0.3\}*0.4+\{(1)*0.5+(1)*0.3+(1)*0.2\}*0.6=0.92$. can be calculated.

As described above, since the controller 170 can assign weights to each piece of information, there is an advantage in that the reliability of the recognition accuracy calculation is improved even when various pieces of information are received by assigning high weights to information with relatively high accuracy.

The database described above can be managed by a server, etc., and the display device 100 can receive data stored in the database from the server. Alternatively, the display device 100 can transmit information received from an external device to the server and then receive the recognition accuracy calculated from the server.

Meanwhile, in the above example, when comparing the information received from the external device and the identification information, it was assumed that the item matches only when all characters match, but the recognition accuracy can also be calculated by considering the number of matching characters in each item.

After calculating the recognition accuracy, the controller 170 can determine whether there are a plurality of devices with the highest recognition accuracy (S304).

That is, the controller 170 can obtain whether there are a plurality of devices with the highest recognition accuracy after calculating the recognition accuracy.

If there are a plurality of devices with the highest recognition accuracy, the controller 170 can display a screen for receiving a selection for one of the plurality of devices with the highest recognition accuracy (S305), and can set the device selected on the screen as the connection device (S307).

That is, if there are a plurality of devices with the highest recognition accuracy, the controller 170 can control the display 180 to display a screen for receiving a input from the user for selecting which of the plurality of devices is the actual connected device.

Figure 7:
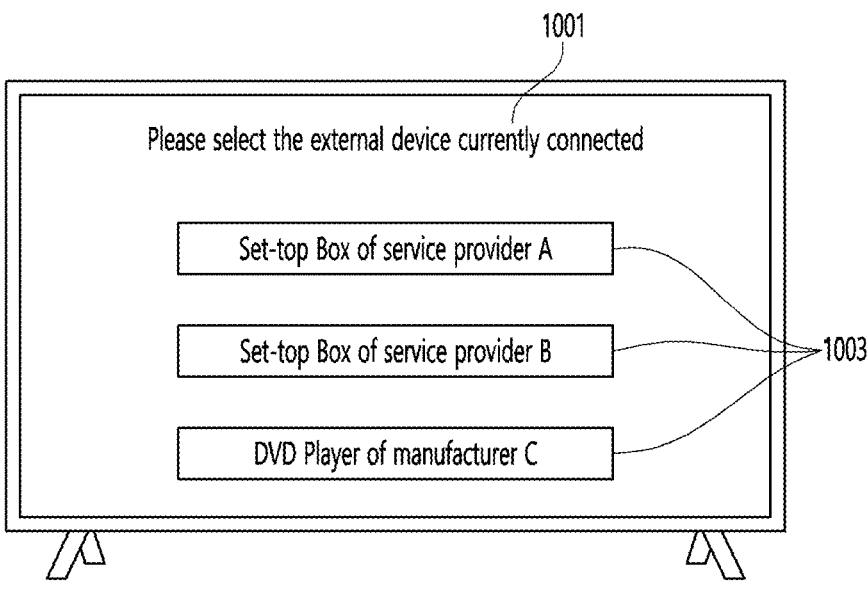
FIG. 7 is a diagram illustrating an example of a screen for receiving a selection a connection device by a display device according to an embodiment of the present disclosure.

FIG. 7 is a drawing showing an example of a screen for receiving a selection for a connection device in a display device according to an embodiment of the present disclosure.

The controller 170 can control the display 180 to display a screen including a guidance message 1001 for selecting a currently connected external device and items 1003 representing recognized devices. That is, if there are a plurality of devices with the highest recognition accuracy, the controller 170 can display a list including the plurality of devices on the screen.

The item 1003 can include information on the recognition device. The information on the recognition device can include a service provider, a manufacturer, a device type, etc., as in the example of FIG. 7.

When the controller 170 receives a command to select one item 1003, it can set the recognition device corresponding to the selected item 1003 as the connection device.

Again, FIG. 6 will be described.

After calculating the recognition accuracy, if there is only one device with the highest recognition accuracy, the controller 170 can set one device with the highest recognition accuracy as the connection device (S309).

That is, if there are a plurality of devices recognized in response to each of the plurality of pieces of information, the controller 170 can set the device with the highest recognition accuracy among the recognized devices as the connection device. For example, if the controller 170 receives the first information and the second information from the external device and recognizes the first device and the second device in response to each of the first information and the second information, the device corresponding to the higher recognition accuracy between the recognition accuracy of the first device and the recognition accuracy of the second device can be set as the connection device.

According to the first embodiment, by setting the device with the highest recognition accuracy as the connection device, there is an advantage of simplifying the control method and minimizing problems due to misrecognition. In addition, if there are the plurality of devices with the highest recognition accuracy, there is an advantage in minimizing problems caused by misrecognition by setting the connection device through user selection.

FIG. 8 is a flowchart illustrating a method for setting a connection device based on a plurality of pieces of information by a display device according to a second embodiment of the present disclosure.

FIG. 8 is a flowchart illustrating a method for performing S30 of FIG. 5 according to a second embodiment.

According to the second embodiment, the controller 170 can recognize a device corresponding to each of the plurality of pieces of information (S311) and calculate the recognition accuracy of the device corresponding to each of the plurality of pieces of information (S313).

Steps S311 and S313 are the same as steps S301 and S303 described in FIG. 6, respectively, and thus, duplicate descriptions will be omitted.

After calculating the recognition accuracy, the controller 170 can determine whether there are a plurality of devices for which the recognition accuracy is calculated to be higher than a preset reference value (S314).

Even though the recognition accuracy is calculated to be high, if it is calculated to be slightly lower than other recognition accuracy, it may be more likely that the connection device is incorrectly set to determine that it is not a connection device. Therefore, according to the second embodiment, the controller 170 may set a reference value in advance, and if the recognition accuracy is higher than the set reference value, it may be considered as a candidate for the connection device. Here, the reference value may be 80 (% or score), but this is only an example, and it is reasonable that it is not limited thereto.

If there are a plurality of devices whose recognition accuracy is calculated to be higher than the preset reference value, the controller 170 may display a screen for receiving a selection for one of the plurality of devices whose recognition accuracy is calculated to be higher than the preset reference value (S315), and may set the device selected on the screen as the connection device (S317).

For example, the controller 170 may display a screen as described in FIG. 7, and may set the selected device as the connection device. That is, steps S315 and S317 are the same as steps S305 and S307 described in FIG. 6, respectively, and thus, duplicate descriptions will be omitted.

Through this, if there are a plurality of recognized devices corresponding to each of the plurality of pieces of information, the controller 170 can set the device whose recognition accuracy is calculated to be at least higher than the preset reference value as the connection device.

Meanwhile, if there are not multiple devices whose recognition accuracy is calculated to be higher than the preset reference value, the controller 170 can obtain whether the recognition accuracy is calculated to be lower than the preset threshold value (S319).

If the recognition accuracy is calculated to be too low, even if the corresponding recognition accuracy is the highest, it is highly likely that it does not correspond to the actual connection device. Therefore, if all of the calculated recognition accuracy is lower than the preset threshold value, it may be necessary to confirm whether the corresponding recognition devices are the connection devices. Here, the threshold value may be 50 (% or score), but this is only an example, and therefore it is reasonable that it is not limited thereto.

Therefore, if the recognition accuracy is calculated to be less than the preset threshold value, the controller 170 can display a screen for receiving a selection for one of the recognized devices (S321) and set the device selected on the screen as the connection device (S323).

Figure 9:
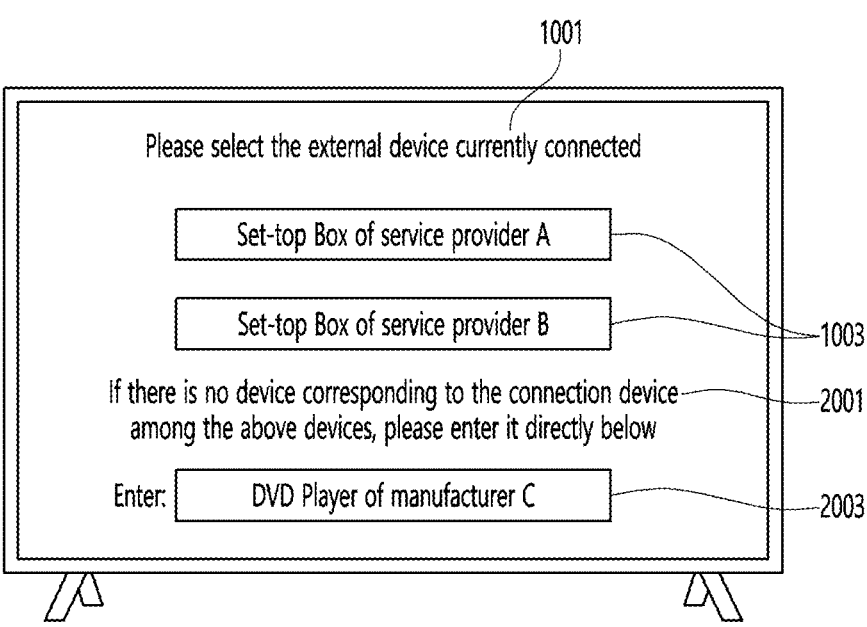
FIG. 9 is a diagram illustrating an another example of a screen for receiving a selection a connection device by a display device according to an embodiment of the present disclosure.

FIG. 9 is a drawing showing another example of a screen for receiving a selection for a connection device according to an embodiment of the present disclosure.

The controller 170 can control the display 180 to display a screen including a first guidance message 1001 for selecting a currently connected external device, items 1003 representing recognized devices, a second guidance message 2001 for manually entering a currently connected external device, and a manual input window 2003.

The first guidance message 1001 and items 1003 are the same as those described in FIG. 7, so a duplicate description will be omitted.

The second guidance message 2001 can include a guidance message for the user to directly enter the actual connection device if there is no item 1003 corresponding to the actual connection device.

The manual input window 2003 can be an input window for directly entering information on the actual connection device from the user.

When the controller 170 receives a command to select one item 1003, it sets the recognition device corresponding to the selected item 1003 as the connection device, and when information on a specific device is entered through the manual input window 2003, it can set the device according to the entered information as the connection device.

Meanwhile, in step S305 of FIG. 6 and step S315 of FIG. 8, it was described that the screen as shown in FIG. 7 is displayed, but the screen as shown in FIG. 9 may be displayed. Conversely, in step S321, the screen as shown in FIG. 6 may be displayed instead of the screen as shown in FIG. 9.

However, since the recognition accuracy is calculated to be less than the preset threshold value in step S321, there is a high possibility that there is no recognition device corresponding to the actual connection device, so the controller 170 can obtain information on the actual connection device by providing the manual input window.

Again, FIG. 8 will be described.

If all recognition accuracies are not calculated to be less than the preset threshold value, the controller 170 can set the device with the highest recognition accuracy as the connection device (S325).

That is, if at least one recognition accuracy is higher than the preset threshold value, the controller 170 can set the device with the highest recognition accuracy as the connection device.

According to the second embodiment, if there are multiple recognition devices with recognition accuracy higher than the preset reference value, the problem of incorrectly setting the connection device due to an error in calculating the recognition accuracy can be minimized by directly setting the connection device from the user. In addition, if all recognition accuracies are calculated to be less than the threshold value, the problem of incorrectly setting the connection device due to an error in calculating the recognition accuracy can be minimized by directly setting the connection device from the user.

Figure 10:
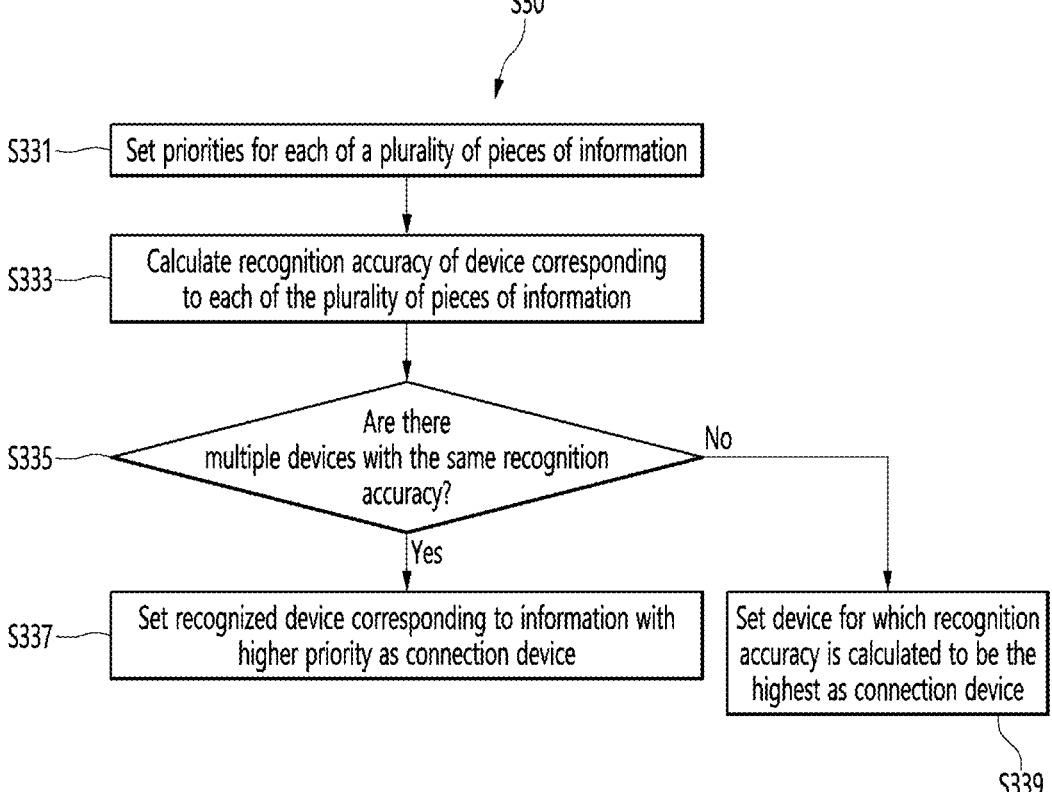
FIG. 10 is a flowchart illustrating a method for a display device according to a third embodiment of the present disclosure to set a connection device based on a plurality of pieces of information.

FIG. 10 is a flowchart illustrating a method for setting a connection device based on a plurality of pieces of information by a display device according to the third embodiment of the present disclosure.

FIG. 10 is a flowchart illustrating a method of performing S30 of FIG. 5 according to the third embodiment.

The controller 170 can set priorities for each of a plurality of pieces of information (S331).

For example, assuming that the types of information received by the external device are SPD Infoframe, CEC packet, IP metadata, and Zigbee packet, the controller 170 can set priorities in the order of CEC packet>IP metadata>SPD Infoframe>Zigbee packet. However, the above-described order is only an example for the convenience of explanation, and thus it is reasonable that it is not limited thereto.

Meanwhile, the controller 170 can change priorities according to the type of device recognized according to the information. In other words, the controller 170 can set priorities differently according to the type of device recognized according to the information.

The controller 170 can calculate the recognition accuracy of the device corresponding to each of the plurality of pieces of information (S333).

This is the same as described in S303 of FIG. 6, so the duplicate description will be omitted.

The controller 170 can obtain whether there are a plurality of devices for which the recognition accuracy is calculated identically (S335).

If there are the plurality of devices for which the recognition accuracy is calculated identically, the controller 170 can set the recognized device corresponding to the information with the higher priority as the connection device (S337).

Specifically, the controller 170 can set the priority for each of the plurality of pieces of information, and if there are a plurality of devices for which the recognition accuracy is calculated identically, the recognized device corresponding to the information with the higher priority can be set as the connection device. For example, if the first information has a higher priority than the second information, and the recognition accuracy of recognizing the first device in response to the first information and the recognition accuracy of recognizing the second device in response to the second information are the same, the first device can be set as the connection device.

Meanwhile, if there are not the plurality of devices for which the recognition accuracy is calculated to be the same, the controller 170 can set the device for which the recognition accuracy is calculated to be the highest as the connection device (S339).

Figure 11:
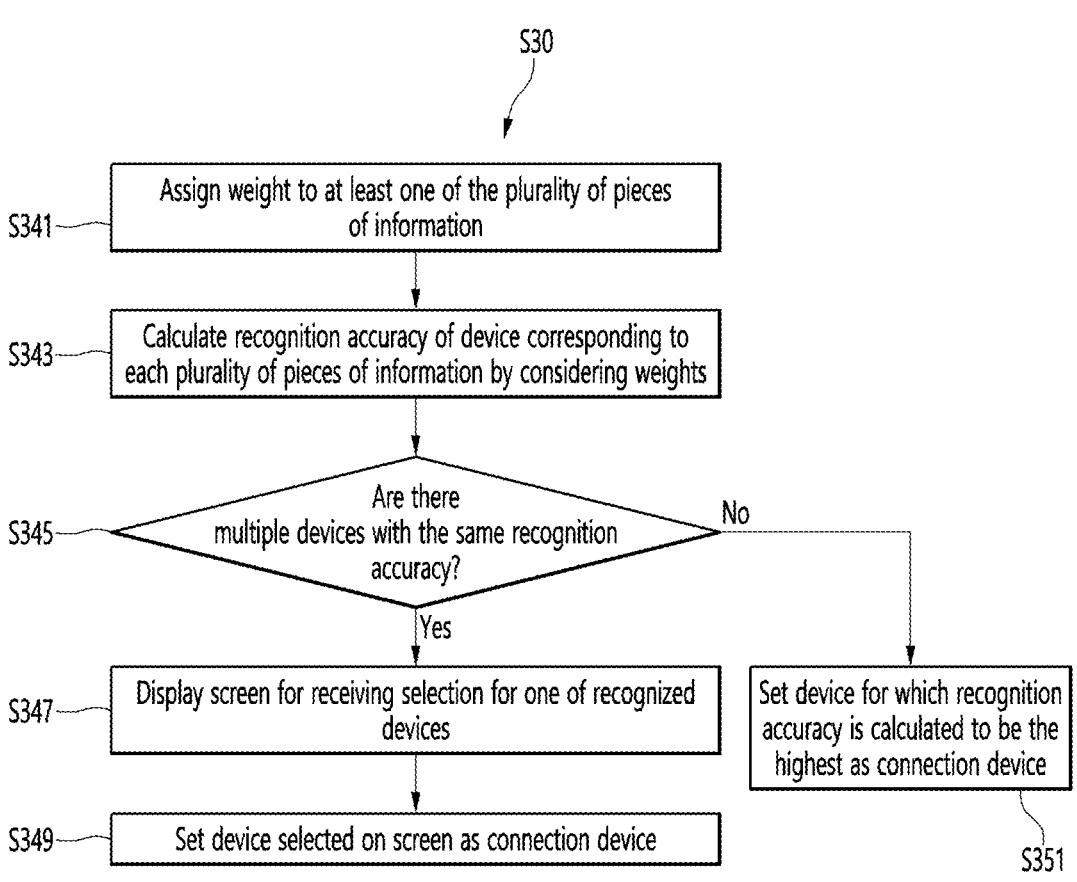
FIG. 11 is a flowchart illustrating a method for a display device according to a fourth embodiment of the present disclosure to set a connection device based on a plurality of pieces of information.

FIG. 11 is a flowchart illustrating a method for setting a connection device based on a plurality of pieces of information according to a fourth embodiment of the present disclosure.

FIG. 11 is a flowchart illustrating a method for performing S30 of FIG. 5 according to a fourth embodiment.

The controller 170 may assign a weight to at least one of the plurality of pieces of information (S341).

In addition, the controller 170 may assign different weights depending on the type of information.

For example, assuming that the types of information received by the external device are SPD Infoframe, CEC packet, IP metadata, and Zigbee packet, the controller 170 may assign weights only to the CEC packet and IP metadata, and may not assign weights to the SPD Infoframe and Zigbee packet.

As another example, when the controller 170 assigns weights only to the CEC packets and IP metadata, the controller 170 may assign a weight of 10 to the CEC packets and a weight of 5 to the IP metadata.

As described above, the controller 170 may or may not assign weights depending on the type of information, and even if weights are assigned, the assigned weight values may vary.

Meanwhile, the weights may be values assigned so that the recognition accuracy is calculated higher. That is, the higher the weight is assigned, the higher the recognition accuracy can be calculated.

The controller 170 may calculate the recognition accuracy of the device corresponding to each plurality of pieces of information by considering the weights (S343).

That is, the controller 170 may calculate the recognition accuracy by assigning a weight to at least one of the plurality of pieces of information.

The controller 170 can obtain whether there are a plurality of devices with the same recognition accuracy (S345).

If there are the plurality of devices with the same recognition accuracy, the controller 170 can display a screen for receiving a selection for one of the recognized devices (S347) and set the device selected on the screen as the connection device (S349).

The controller 170 can display a screen as shown in FIG. 7 or FIG. 9 to receive a selection of one device and set it as the connection device.

Meanwhile, if there is no device with the same recognition accuracy, the controller 170 can set the device with the highest recognition accuracy as the connection device (S351).

As described above, the controller 170 can recognize a device and calculate recognition accuracy using information received from an external device according to various embodiments and set the connection device.

Again, FIG. 5 will be described.

The controller 170 can obtain whether additional information is received from the external device (S40).

That is, the controller 170 can determine whether additional information is received from the external device after recognizing the external device and setting the recognized device as the connection device.

If additional information is not received, the controller 170 can maintain the current connection device setting.

Meanwhile, if the controller 170 receives additional information, it can recognize the device corresponding to the additional information and change or maintain the set connection device (S50).

That is, the controller 170 recognizes the device corresponding to the additional information based on the additional information. If the recognized device is different from the currently set device, the controller 170 can change the connection device to the device recognized corresponding to the additional information. And, if the recognized device is the same as the currently set device, the controller 170 can maintain the setting of the current connection device.

For example, if the controller 170 sets the recognized first device as the connection device in response to the first information received from the external device and then receives second information, if the recognition accuracy of the recognized second device based on the second information is higher than the recognition accuracy of the first device, the connection device can be changed to the second device. Similarly, if the controller 170 sets the recognized first device as the connection device in response to the first information received from the external device and then receives second information, if the recognition accuracy of the recognized second device based on the second information is lower than the recognition accuracy of the first device, the connection device can be maintained as the first device.

In this way, the controller 170 can change or maintain the set connection device by recognizing the device corresponding to the received information every time information is received from the external device even after setting the external device.

That is, according to the embodiment of the present disclosure, there is an advantage in that the problem of the connection device being set incorrectly can be supplemented by verifying and modifying the set connection device even after the controller 170 sets the connection device.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device, comprising:
   a display;
   an external device interface configured to connect to an external device; and
   a controller configured to recognize a device corresponding to information received from the external device and set the recognized device as a connection device through the external device interface,
   wherein the controller is configured to:
   when receiving a plurality of pieces of information from the external device, recognize a device corresponding to each of the plurality of pieces of information,
   calculate a recognition accuracy of a device corresponding to each of the plurality of pieces of information,
   wherein the recognition accuracy is a probability or score that the recognized device corresponds to the external device connected through the external device interface, and
   set a recognized device corresponding to one of the plurality of pieces of information as the connection device based on the calculated recognition accuracy,
   wherein the controller is further configured to calculate the recognition accuracy based on a type and number of data that serve as criteria for recognizing the device in each of the plurality of pieces of information.

2. The display device of claim 1, wherein the controller is configured to:
   when there are a plurality of recognized devices corresponding to each of the plurality of pieces of information, set a device with a highest recognition accuracy among the plurality of recognized devices as the connection device.

3. The display device of claim 1, wherein the controller is configured to:
   when receiving first information and second information from the external device and recognizing a first device and a second device corresponding to the first information and the second information, respectively, set a device corresponding to a higher recognition accuracy among a recognition accuracy of the first device and a recognition accuracy of the second device as the connection device.

4. The display device of claim 3, wherein the controller is configured to:
   display a screen for receiving a selection for one of the first device and the second device on the display when the recognition accuracy of the first device and the recognition accuracy of the second device are the same.

5. The display device of claim 1, wherein the controller is configured to:
   when there are a plurality of devices recognized corresponding to each of the plurality of pieces of information, set a device whose recognition accuracy is calculated to be higher than a preset reference value as the connection device.

6. The display device of claim 5, wherein the controller is configured to:

when there are a plurality of devices whose recognition accuracy is calculated to be higher than a preset reference value, display a screen for receiving a selection for one of the plurality of devices whose recognition accuracy is calculated to be higher than the preset reference value on the display.

7. The display device of claim 5, wherein the controller is configured to:

when there are a plurality of recognized devices corresponding to each of the plurality of pieces of information, if the recognition accuracy of each device for each of the plurality of pieces of information is calculated to be less than a preset threshold value, display a screen for receiving a selection for one of the recognized devices corresponding to each of the plurality of pieces of information on the display.

8. The display device of claim 1, wherein the controller is configured to:

set priorities for each of the plurality of pieces of information, and if there are a plurality of devices with the same recognition accuracy, set a device recognized corresponding to information with a highest priority as the connection device.

9. The display device of claim 8, wherein the controller is configured to set the priorities differently depending on a device type.

10. The display device of claim 1, wherein the controller is configured to calculate the recognition accuracy by assigning weight to at least one of the plurality of pieces of information.

11. The display device of claim 1, wherein the controller is configured to assign different weights to each of the plurality of pieces of information depending on information type.

12. The display device of claim 1, wherein the controller is configured to:

when receiving second information after setting a first device recognized corresponding to first information received from the external device as the connection device, and if a recognition accuracy of a second device recognized based on the second information is higher than a recognition accuracy of the first device, change the connection device to the second device.

13. The display device of claim 12, wherein the controller is configured to:

when receiving second information after setting a first device recognized corresponding to first information received from the external device as the connection device, and if a recognition accuracy of the second device recognized based on the second information is lower than a recognition accuracy of the first device, maintain the connection device as the first device.

14. The display device of claim 1, wherein the controller is configured to:

change or maintain the set connection device by recognizing a device corresponding to a received information whenever information is received from the external device.

15. The display device of claim 1, wherein the plurality of pieces of information includes at least one of SPD Infoframe, CEC packet, IP metadata and Zigbee packet.

* * * * *